United States Patent [19]
Mihic

[11] Patent Number: 5,382,122
[45] Date of Patent: Jan. 17, 1995

[54] BALANCING DEVICE FOR ROTARY CUTTING TOOLS

[75] Inventor: Wlajko Mihic, Gävle, Sweden

[73] Assignee: Mircona AB, Gävle, Sweden

[21] Appl. No.: 157,097

[22] PCT Filed: Jun. 3, 1992

[86] PCT No.: PCT/SE92/00379
§ 371 Date: Nov. 30, 1993
§ 102(e) Date: Nov. 30, 1993

[87] PCT Pub. No.: WO92/21463
PCT Pub. Date: Dec. 10, 1992

[30] Foreign Application Priority Data
Jun. 4, 1991 [SE] Sweden .................. 9101692

[51] Int. Cl.6 .................................. B23B 31/02
[52] U.S. Cl. .................................. 409/141; 408/143
[58] Field of Search ............. 408/143, 146, 147, 238; 409/141, 232, 234; 74/573 R

[56] References Cited

U.S. PATENT DOCUMENTS

| | | |
|---|---|---|
| 3,180,187 | 4/1965 | McFerren . |
| 4,599,769 | 7/1986 | Latzko . |
| 4,648,763 | 3/1987 | Safranek . |
| 4,899,628 | 2/1990 | Seichter . |

FOREIGN PATENT DOCUMENTS

| | | | |
|---|---|---|---|
| 2723042 | 11/1983 | Germany . | |
| 3408352 | 9/1985 | Germany . | |
| 3433793 | 3/1986 | Germany . | |
| 2232101 | 12/1990 | United Kingdom . | |
| 435070 | 11/1974 | U.S.S.R. | 408/147 |
| 1096052 | 6/1984 | U.S.S.R. | 409/141 |

*Primary Examiner*—Daniel W. Howell
*Attorney, Agent, or Firm*—Ware, Fressola, Van der Sluys & Adolphson

[57] ABSTRACT

A device is provided to eliminate unbalance and vibration occurring due to nonsymmetrical mounting of rotatable tools and tool holders in milling machines, arboring machines, drilling machines, etc. Attached to the tool holder in an appropriate place is a weight support able to receive one or more appropriately sized weights. The weights being radially adjustably securable to the weight support.

4 Claims, 1 Drawing Sheet

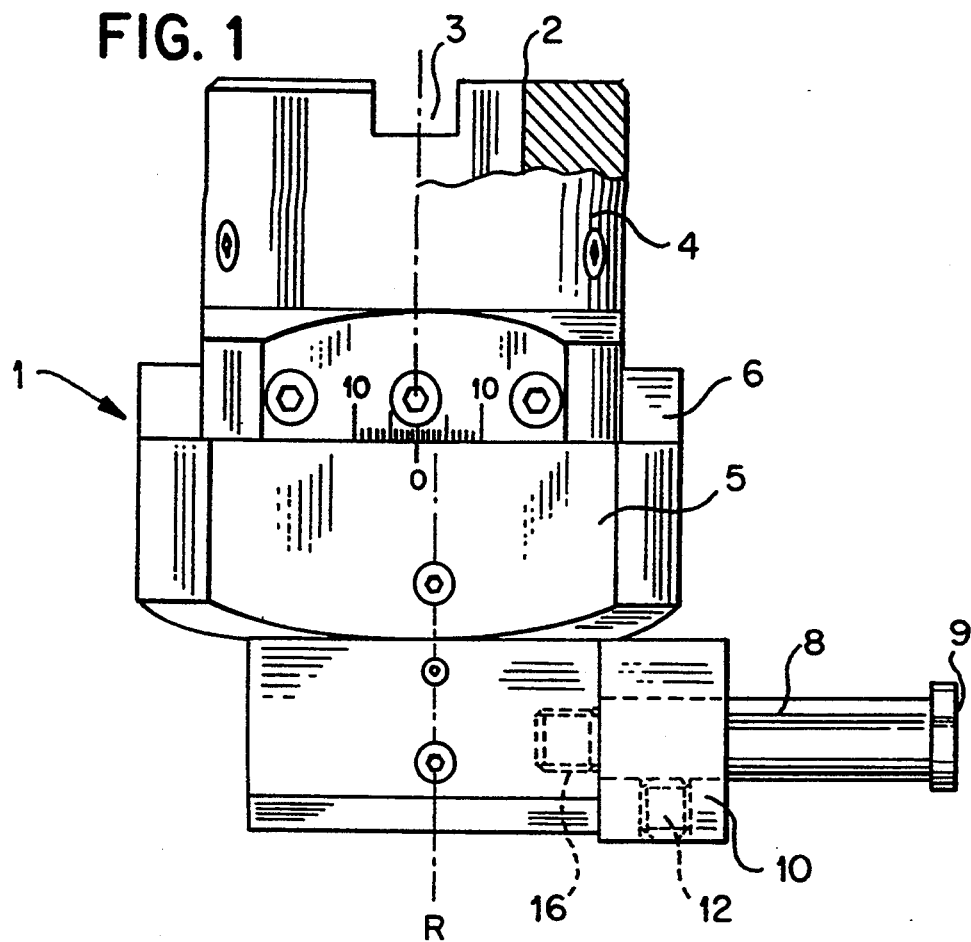
FIG. 1
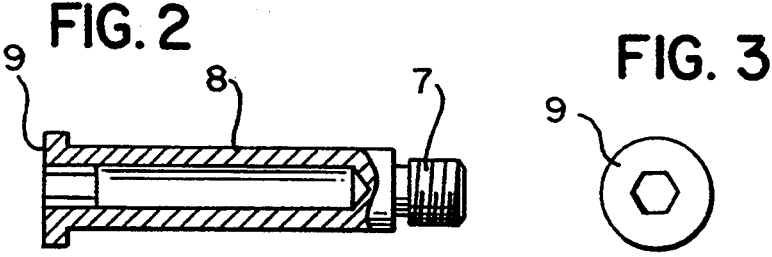
FIG. 2
FIG. 3
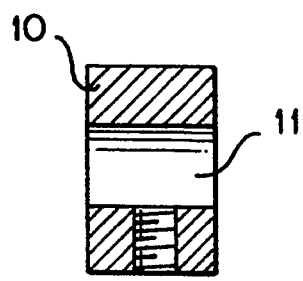
FIG. 4

BALANCING DEVICE FOR ROTARY CUTTING TOOLS

P BACKGROUND OF THE INVENTION

1. Technical Field of the Invention

This invention relates to the area of cutting and machining and more particularly to milling tools and the like intended to be fixed at a tool holder for inside machining of a work piece and preferably for cutting tools including a holder device displaceably arranged relatively to the axis of rotation.

2. Description of the Prior Art

Tools and arrangements of the kind mentioned above having the position of the tool or the tool holder radially offset and thereby unbalanced exist in connection with various cutting techniques, especially in milling or arboring machines and the like where a rotatable tool holder carries a tool and the tool is fastened in such a way that the center of gravity will be offset from the axis of rotation. In slowly turning machines, the relatively small weight of the tool has no negative influence on the machine as a whole. In the majority of cases, two tools are used and allowed to balance each other.

In high speed machines of the kind used more and more today and especially in machines having one single tool, problems arise. Many such machines are placed on shoes or pads, i.e. fasteners having vibration dampings bodies of rubber or similar material, and it has been found that, if an unbalanced tool is used in such a machine, the whole machine may start vibrating which can negatively effect the resulting work. As a consequence, the user may have to refrain from utilizing the machine at high speed.

Earlier double or triple mounted tools cannot be used in precision machining where it is intended to use cutting inserts of the types most in demand today as such tools would require complicated relative adjustment. It is also not possible to use standard inserts and tool holders for double mounting arrangements and the result will be that the speed must be kept low if vibration is to be avoided and standard parts are to be used.

An object of the present invention is to bring about an arrangement eliminating the above mentioned drawbacks resulting from nonsymmetrical mounting of rotating tools and tool holders in milling machines, arboring machines, drilling machines and the like and making it possible to use in a practical way replaceable inserts of modern design which allow high yield and simultaneously give a high quality result.

SUMMARY OF THE INVENTION

In a milling spindle or shaft of the milling head and tool holder the vibration problems occur because the tool with its cutting insert are not correctly balanced in radial direction. The vibrations and unbalance bring the whole machine into a state of resonance vibration and this is more prevalent if the machine is supported by elastic pads. If the machine is firmly secured by bolts directly to the foundation or to a floor, the vibrations may seem to be less intense but the machine nevertheless will be affected negatively. Additionally, there may be discomfort for the operator.

According to the invention, the problem is solved by attaching to the tool holder in an appropriate position a carrier means adapted to receive one or more weights of appropriate sizes and by arranging the weight or weights to be radially adjustably attachable to the weight carrier means.

BRIEF DESCRIPTION OF THE DRAWING

One embodiment of the device according to the invention will be described with reference to the attached drawing, in which:

FIG. 1 is a side elevational view showing a portion of a tool holder to be attached to a milling machine shaft, said holder presenting the device according to the invention, FIGS. 2 and 3 are a longitudinal sectional view and an end view, respectively, of a weight holder used in the present invention, and FIG. 4 is a longitudinal sectional view of a weight.

DETAILED DESCRIPTION OF THE INVENTION

A tool holder part 1 has an end face 2 presenting a recess 3 for receiving a wedge (not shown) adapted to fit into and be secured to corresponding details of a machine (not shown), i.e. an end milling arbor or the like. The tool holder part 1 includes an inner portion 4 and an outer portion 5 which by means of a slide guide 6 and by a screw device (not shown) is radially displaceable relatively to the inner portion 4.

At the outer portion 5 of the tool holder part 1, there are appropriately arranged abutments and clamping means for a tool holder (not shown). By using single tool holders projecting more or less in the one radial direction only, there will occur at the outer portion 5 an unbalance which on rotation naturally also vibrates the tool holder part 1. As different machining operations demand different radial settings and further, during the course of such operations, for example in internal turning, the tool holder with the tool will be displaced radially outwardly resulting in different degrees of unbalance. By attaching tools having different weights in different radial positions, the center of gravity will be moved more or less away from the axis R of rotation.

According to the invention, on the tool holder, at least on one side thereof and preferably on the side opposite the side towards any radial displacement, there is an attachment seat for a weight holder arranged for receiving and securing weights in different positions.

As shown in FIG. 1, the outer part 5 of the tool holder has a threaded bore 16 which receives a threaded end portion 7 (FIG. 2) of a hollow shaft 8 having a head 9 with a wrench attachment. Referring again to FIG. 1, one or more weights 10 may be fastened to the shaft 8 according to the balancing requirements. Each weight has a body having a through bore 11 (FIG. 4) and also a lateral threaded bore for a stop screw 12 (FIG. 1).

The size or weight of each weight 10 may be determined by the balancing requirements. Alternatively, instead of a one piece body 10, several thin washers or rings in sets together can cover a wide range of weights. By making the weight or weights displaceable and affixable in different positions, a very good adaptability is achieved for different balancing requirements. In FIG. 1 of the drawing, the weight 10 is shown its inner most position and it is displaceable from this position to any position as far as the head 9 of the shaft 8 and each such position results in a different balancing value.

The invention is not limited to the embodiment shown above but can be varied within the framework of the following patent claims.

What is claimed is:

1. A balancing device for a rotatable tool holder where a tool is attachable in different radial positions relatively to an axis of rotation of the tool holder thereby causing an unbalance, comprising:

(a) support means positioned in a predominant direction of radial displacement of the tool and adapted to receive at least one radially adjustable weight, said support means includes an elongated shaft threaded into and extending from a radial bore in the tool holder in an outer part thereof radially movable relatively to an inner part, said elongated shaft having an outer head; and (b) at least one weight radially adjustably secured to said elongated shaft.

2. The balancing device according to claim 1, wherein each of said at least one weight has a positioning and locking screw to engage said elongated shaft.

3. The balancing device according to claim 1, wherein said at least one weight is a plurality of ring like elements of which at least some have means for securing themselves on said elongated shaft.

4. The balancing device according to claim 1, wherein said at least one weight has a cylindrical shape.

* * * * *